(12) United States Patent
Cui et al.

(10) Patent No.: US 11,946,759 B2
(45) Date of Patent: Apr. 2, 2024

(54) ELECTRONIC DEVICE, WIRELESS COMMUNICATION METHOD AND COMPUTER-READABLE STORAGE MEDIUM

(71) Applicant: Sony Group Corporation, Tokyo (JP)

(72) Inventors: Tao Cui, Beijing (CN); Chen Sun, Beijing (CN); Rui Lu, Beijing (CN); Yi Liu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 47 days.

(21) Appl. No.: 17/762,368

(22) PCT Filed: Oct. 26, 2020

(86) PCT No.: PCT/CN2020/123493
§ 371 (c)(1),
(2) Date: Mar. 22, 2022

(87) PCT Pub. No.: WO2021/083063
PCT Pub. Date: May 6, 2021

(65) Prior Publication Data
US 2022/0381570 A1      Dec. 1, 2022

(30) Foreign Application Priority Data

Nov. 1, 2019    (CN) .......................... 201911059871.X

(51) Int. Cl.
*H04W 4/40*        (2018.01)
*G01C 21/34*       (2006.01)
(Continued)

(52) U.S. Cl.
CPC ..... *G01C 21/3461* (2013.01); *G01C 21/3415* (2013.01); *G07C 5/008* (2013.01); *H04W 4/40* (2018.02); *G08G 1/096811* (2013.01)

(58) Field of Classification Search
CPC ............ G01C 21/3461; G01C 21/3415; G01C 21/3407; G01C 21/3453; G01C 21/3446;
(Continued)

(56) References Cited

U.S. PATENT DOCUMENTS

| 4,956,999 | A  | * | 9/1990  | Bohannan ............... G01N 29/14 |
|           |    |   |         | 73/594                              |
| 8,909,466 | B2 |   | 12/2014 | Rogers et al.                       |
| 9,751,527 | B2 | * | 9/2017  | Moeller ................ B60W 10/20 |
| 2007/0225900 | A1 | * | 9/2007 | Kropp ................ G01C 21/3461 |
|           |    |   |         | 340/995.23                          |

(Continued)

FOREIGN PATENT DOCUMENTS

| CN | 103542859 A | 1/2014 |
| CN | 106503868 A | 3/2017 |

(Continued)

OTHER PUBLICATIONS

International Search Report and Written Opinion dated Jan. 26, 2021, received for PCT Application PCT/CN2020/123493, Filed on Oct. 26, 2020, 10 pages including English Translation.

*Primary Examiner* — Yonel Beaulieu
(74) *Attorney, Agent, or Firm* — XSENSUS LLP

(57) ABSTRACT

The present disclosure relates to an electronic device, a wireless communication method and a computer-readable storage medium. The electronic device for a vehicle according to the present disclosure comprises a processing circuit configured to: determine load information of the vehicle; generate vehicle information, with the vehicle information comprising the load information of the vehicle; and send the vehicle information to a server for the server to determine, according to the vehicle information, road planning information for the vehicle. By using the electronic device, the wireless communication method and the computer-readable storage medium according to the present disclosure, the load information of the vehicle can be taken into consideration during road planning and decision planning, thereby better (Continued)

managing the load of the vehicle and more rationally planning a road.

18 Claims, 7 Drawing Sheets

(51) Int. Cl.
*G07C 5/00* (2006.01)
*G08G 1/08* (2006.01)
*G08G 1/0968* (2006.01)

(58) Field of Classification Search
CPC .......... G07C 5/008; H04W 4/40; H04W 4/44; G08G 1/096811; G08G 1/096725; G08G 1/096741; G08G 1/164; G08G 1/096775; G08G 1/096783; G08G 1/207; G08G 1/22; G08G 1/0968; H04L 67/12; H04Q 9/00; H04Q 2209/40; H04Q 2209/826; G01G 19/10; G01G 19/08; G01B 21/00; G01L 17/00; G08C 17/02; B60C 23/02; B60W 60/001; B60W 2530/10; B60W 2530/20; B60W 2530/201; G06Q 50/30

See application file for complete search history.

(56) References Cited

U.S. PATENT DOCUMENTS

| | | | |
|---|---|---|---|
| 2010/0030466 A1 | 2/2010 | Rogers | |
| 2017/0192437 A1 | 7/2017 | Bier | |
| 2017/0243485 A1* | 8/2017 | Rubin | H04W 4/46 |
| 2017/0262790 A1* | 9/2017 | Khasis | G08G 1/012 |
| 2019/0051158 A1 | 2/2019 | Felip Leon | |
| 2021/0064018 A1* | 3/2021 | Hazard | G06N 7/01 |

FOREIGN PATENT DOCUMENTS

| | | | | |
|---|---|---|---|---|
| CN | 106660554 A | 5/2017 | | |
| CN | 107798861 A | 3/2018 | | |
| CN | 108011947 A | 5/2018 | | |
| CN | 108037760 A | 5/2018 | | |
| CN | 108680180 A | 10/2018 | | |
| CN | 108877199 A | 11/2018 | | |
| CN | 109147370 A | 1/2019 | | |
| CN | 109506667 A | 3/2019 | | |
| CN | 109979239 A | 7/2019 | | |
| CN | 110036423 A | 7/2019 | | |
| CN | 110310480 A | 10/2019 | | |
| CN | 110337088 A | 10/2019 | | |
| CN | 110364009 A | 10/2019 | | |
| DE | 202019101660 U1 | 9/2019 | | |
| EP | 1832843 A1 * | 9/2007 | | G01C 21/3461 |
| WO | WO-2021216921 A1 * | 10/2021 | | G01C 21/3461 |

* cited by examiner

ELECTRONIC DEVICE, WIRELESS COMMUNICATION METHOD AND COMPUTER-READABLE STORAGE MEDIUM

CROSS-REFERENCE TO RELATED APPLICATIONS

This application is based on PCT/CN2020/123493 filed on Oct. 26, 2020, which claims priority to Chinese Patent Application No. 201911059871.X, titled "ELECTRONIC DEVICE, WIRELESS COMMUNICATION METHOD, AND COMPUTER-READABLE STORAGE MEDIUM", filed on Nov. 1, 2019 with the China National Intellectual Property Administration, the entire contents of each are incorporated herein by reference in its entirety.

FIELD

Embodiments of the present disclosure generally relate to the field of wireless communication, and in particular to an electronic device, a wireless communication method, and a computer-readable storage medium. More specifically, the present disclosure relates to an electronic device for a vehicle, an electronic device for a server, a wireless communication method performed by an electronic device for a vehicle, a wireless communication method performed by an electronic device for a server, and a computer-readable storage medium.

BACKGROUND

In a process of driving a non-autonomous vehicle by means of a navigation system, the navigation system may plan a route for the vehicle based on a current location of the vehicle, a destination location, road condition information, and the like.

In a process of driving an autonomous vehicle by means of a road side sub-system (RSS), the autonomous vehicle may send, to the RSS, vehicle driving information including real-time operating information of the vehicle (location, travel direction, travel route, speed and acceleration, operating status), auxiliary planning information (driving intention, planned travel route, allowable maximum speed and acceleration, requirements on right level of way), vehicle body information (vehicle type), vehicle perception information (vehicle perception on a surrounding vehicle and object in view of type, location, size, speed, and the like), and the like; and the RSS may generate, based on the information reported from the autonomous vehicle and road condition information obtained by a road side unit (RSU), decision planning information for passing through an intersection, including a behavioral decision (to travel forward, stop, turn left, turn right, change a lane, and the like), a corresponding lane, an action decision (path planning, speed, angle, and the like), and a moving track point and a time for arriving the track point. As a result, the automatic driving control system of the autonomous vehicle may control the vehicle based on the decision planning information.

It can be seen that weight information of the vehicle is not considered when determining the road planning information for either the non-autonomous vehicle or the autonomous vehicle, and therefore weight of the vehicle cannot be better managed, which also affects rationality of a road planning.

Therefore, it is necessary to propose a technical solution to consider the weight information of the vehicle during road planning, so as to better manage the weight of the vehicle and perform a more reasonable road planning.

SUMMARY

A general summary of the present disclosure is provided in this section, which is not a comprehensive disclosure of a full scope or all features thereof.

An objective of the present disclosure is to provide an electronic device, a wireless communication method and a computer-readable storage medium, in order to take weight information of a vehicle into consideration during a road planning and decision planning, and thereby better manage weight of a vehicle and perform the road planning more rationally.

According to an aspect of the present disclosure, an electronic device for a vehicle is provided, including processing circuitry configured to: determine weight information of the vehicle; generate vehicle information, which comprises the weight information of the vehicle; and send the vehicle information to a server, for the server to determine road planning information for the vehicle according to the vehicle information.

According to another aspect of the present disclosure, an electronic device is provided, including processing circuitry configured to: receive, from a vehicle, vehicle information comprising weight information of the vehicle; determine road planning information for the vehicle according to the vehicle information; and send the road planning information for the vehicle to the vehicle.

According to another aspect of the present disclosure, a wireless communication method performed by an electronic device for a vehicle is provided, including: determining weight information of the vehicle; generating vehicle information including the weight information of the vehicle; and sending the vehicle information to a server, for the server to determine road planning information for the vehicle according to the vehicle information.

According to another aspect of the present disclosure, a wireless communication method performed by an electronic device is provided, including: receiving, from a vehicle, vehicle information comprising weight information of the vehicle; determining road planning information for the vehicle according to the vehicle information; and sending, to the vehicle, the road planning information for the vehicle.

According to another aspect of the present disclosure, a computer-readable storage medium is provided, including executable computer instructions, where the executable computer instructions, when executed by a computer, cause the computer to perform the wireless communication method according to the present disclosure.

With the electronic device, the wireless communication method and the computer-readable storage medium according to the present disclosure, the electronic device for a vehicle may send vehicle information including weight information of the vehicle to a server, so that the sever may determine road planning information based on the vehicle information. In this way, the weight information of the vehicle is considered by the server during road planning and decision planning, and therefore a weight of the vehicle may be better managed and a road planning may be carried out more rationally.

Further applicability areas will become apparent from the description provided herein. The description and specific examples in this summary are for illustrative purposes only, and are not intended to limit the scope of the present disclosure.

BRIEF DESCRIPTION OF THE DRAWINGS

The drawings described herein are only for illustrative purposes of selected embodiments rather than all possible implementations, and are not intended to limit the scope of the present disclosure. In the drawings.

Figure 1:
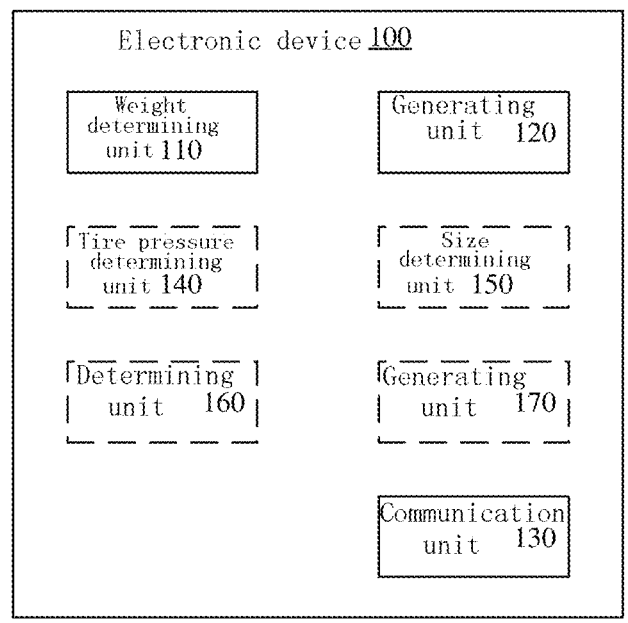
FIG. 1 is a block diagram showing an exemplary configuration of an electronic device for a vehicle according to an embodiment of the present disclosure.

Although the present disclosure is susceptible to various modifications and alternative forms, specific embodiments thereof have been shown in the drawings as examples and are described in detail herein. However, it should be understood that the description of specific embodiments herein is not intended to limit the present disclosure to the disclosed specific forms; on the contrary, the purpose of the present disclosure is to cover all modifications, equivalents and replacements that fall within the spirit and scope of the present disclosure. It should be noted that throughout the several drawings, corresponding reference numerals indicate corresponding parts.

DETAILED DESCRIPTION

Examples of the present disclosure are described more adequately with reference to the drawings. The following description is merely exemplary, and is not intended to limit the present disclosure, application, or use.

Example embodiments are provided so that the present disclosure will be thorough and fully convey the scope to those skilled in the art. Numerous specific details such as examples of specific components, devices, and methods are set forth to provide a thorough understanding of the embodiments of the present disclosure. It will be apparent to those skilled in the art that the example embodiments may be implemented in many different forms without using specific details, none of which should be construed as limiting the scope of the present disclosure. In some example embodiments, well-known processes, well-known structures, and well-known technologies are not described in detail.

The description are made in the following order:
1. Configuration examples of an electronic device for a vehicle;
2. Configuration examples of an electronic device for a server:
3. Method embodiments; and
4. Application examples.

1. Configuration Example of an Electronic Device for a Vehicle

FIG. 1 is a block diagram showing an exemplary configuration of an electronic device 100 according to an embodiment of the present disclosure. The electronic device 100 here may be an electronic device for a vehicle, such as a terminal device placed or integrated in the vehicle. Further, the electronic device 100 may communicate with a server that services the electronic device 100. In particular, in an automatic driving system, the server is located in an RSS, and the electronic device 1X) may communicate with the server in the RSS via an RSU. Communication between the electronic device 100 and the RSU may be in a broadcast manner, and communication between the RSU and the RSS may be in a unicast or multicast manner.

As shown in FIG. 1, the electronic device 100 may include a weight determining unit 110, a generating unit 120, and a communication unit 130.

Here, each unit of the electronic device 100 may be included in a processing circuit. It should be noted that the electronic device 100 may include a single processing circuit or multiple processing circuits. Further, the processing circuit may include various discrete functional units to perform various different functions and/or operations. It should be noted that these functional units may be physical entities or logical entities, and units with different titles may be implemented by a same physical entity.

According to an embodiment of the present disclosure, in a case where the electronic device 100 is applied to an autonomous vehicle, the weight determining unit 110, the generating unit 120, a tire pressure determining unit 140, a size determining unit 150, a determining unit 160, and a generating unit 170 of the electronic device 10) may be integrated in a smart vehicle-side computing control unit of the autonomous vehicle, and the communication unit 130 may be implemented by an on-board unit (OBU).

According to an embodiment of the present disclosure, the weight determining unit 110 may determine weight information of the vehicle.

According to an embodiment of the present disclosure, the generating unit 120 may generate vehicle information which includes the weight information of the vehicle.

According to an embodiment of the present disclosure, the electronic device 100 may send the vehicle information to the server via the communication unit 130, for the server to determine road planning information for the vehicle based on the vehicle information.

It can be seen that, the electronic device 100 according to the present disclosure may send the vehicle information including weight information of the vehicle to the server, so that the server may determine road planning information based on the vehicle information. In this way, the weight information of the vehicle is considered by the server during road planning and decision planning, and therefore a weight of the vehicle may be better managed and a road planning may be carried out more reasonably.

According to an embodiment of the present disclosure, the weight information determined by the weight determining unit 110 may include a current weight of the vehicle and/or a maximum weight of the vehicle. For example, the maximum weight of the vehicle may be a parameter set when the vehicle is delivered from the factory, and may be directly obtained by the weight determining unit 110. In addition, the current weight of the vehicle may be sensed by an onboard pressure sensor and determined by the weight determining unit 110 based on a sensing result from the pressure sensor, for example. Here, the pressure sensor may sense the current weight of the vehicle in real time to ensure that the weight determined by the weight determining unit 110 is a latest value.

According to an embodiment of the present disclosure, as shown in FIG. 1, the electronic device 100 may further include a tire pressure determining unit 140 configured to determine tire pressure information of the vehicle. Here, the tire pressure determining unit 140 may determine the tire pressure information of the vehicle through any method known in the art, which is not limited herein. Further, the generating unit 120 may include tire pressure information of the vehicle into the generated vehicle information.

According to an embodiment of the present disclosure, as shown in FIG. 1, the electronic device 100 may further include a size determining unit 150 configured to determine size information of the vehicle. The size information of the vehicle includes a length, a width, and a height of the vehicle. Here, since a truck has different heights when delivering different goods, the size determining unit 150 may update the height of the vehicle in real time. The generating unit 120 may further include the size information of the vehicle into the generated vehicle information.

According to an embodiment of the present disclosure, the vehicle information generated by the generating unit 120 may include at least one of the weight information of the vehicle, the tire pressure information of the vehicle, and the size information of the vehicle. In addition, the generating unit 120 may carry the vehicle information using a Basic Safety Message (BSM).

A content of a modified BSM message is illustrated below.

```
BasicSafetyMessage ::= SEQUENCE {
    msgCnt MsgCount,
    id OCTET STRING (SIZE(8)),
    -- vehicle ID
    plateNo OCTET STRING (SIZE(4..16)) OPTIONAL,
    -- Reserved for Electronic Vehicle Identification
    secMark DSecond,
    timeConfidence TimeConfidence OPTIONAL,
    pos Position3D,
    posAccuracy PositionalAccuracy OPTIONAL,
    -- Accuracy for GNSS system
    posConfidence PositionConfidenceSet OPTIONAL,
    -- Realtime position confidence
    transmission TransmissionState,
    speed Speed,
    heading Heading,
    angle SteeringWheelAngle OPTIONAL,
    motionCfd MotionConfidenceSet OPTIONAL,
    accelSet AccelerationSet4Way,
    brakes BrakeSystemStatus,
    size VehicleSize,
    weight VehicleWeight,
    tirepressure Pressure, OPTIONAL
```

```
    vehicleClass VehicleClassification,
    --VehicleClassification includes BasicVehicleClass and other
extendible type
        safetyExt VehicleSafetyExtensions OPTIONAL,
        emergencyExt VehicleEmergencyExtensions OPTIONAL,
        ...
    }
```

In the message, size represents a parameter of the size information of the vehicle added in the BSM, and VehicleSize represents a size of the vehicle; weight represents a parameter of the weight information of the vehicle added to the BSM, and VehicleWeight represents a weight of the vehicle; and tirepressure represents a parameter of the tire pressure information of the vehicle added in the BSM, and Pressure represents a tire pressure of the vehicle.

A content of the VehicleSize representing a size of the vehicle is illustrated bellow.

```
VehicleSize ::= SEQUENCE {
    length Length,
    width Width,
    height Height
}
Length::= FLOAT (0..63)
Unit is 0.1m
Width::= FLOAT (0..7)
Unit is 0.1m
Height::= FLOAT (0..15)
Unit is 0.1m
```

As shown above, the size information of the vehicle includes a length, a width and a height of the vehicle. Specifically, length represents a parameter of a length of the vehicle, and Length represents the length of the vehicle, which is in a data type of floating point and with a step of 0.1 meters; width represents a parameter of a width of the vehicle, and Width represents the width of the vehicle, which is in a data type of floating point and with a step of is 0.1 meters; and height represents a parameter of a height of the vehicle, and Height represents the height of the vehicle, which is in a data type of floating point and with a step of 0.1 meters.

A content of the VehicleWeight representing a weight of the vehicle is illustrated bellow.

```
VehicleWeight ::= SEQUENCE {
    currentweight CurrentWeight,
    maxweight MaxWeight
}
CurrentWeight::= INTEGER (0..255)
-- Unit is It
MaxWeight::= INTEGER (0..1023)
-- Unit is It
```

As shown above, the weight information of the vehicle includes a current weight of the vehicle and a maximum weight of the vehicle. Specifically, currentweight represents a parameter of a current weight of the vehicle, and CurrentWeight represents the current weight of the vehicle, which is in a data type of integer and with a step of 1 ton; and maxweight represents a parameter of a maximum weight of the vehicle, and MaxWeight represents the maximum weight of the vehicle, which is in a data type of integer and with a step of 1 ton.

A content of the Pressure representing the tire pressure of the vehicle is illustrated bellow.

Pressure::=FLOAT (0.7)

Unit is 0.1 bar

As shown above, Pressure represents a tire pressure of the vehicle, which is in a data type of floating point and with a step of 0.1 bars.

Described above is an embodiment in which the weight information of the vehicle, the size information of the vehicle, and the tire pressure information of the vehicle are added to the BSM. It is to be noted that it is also possible to add only one or two of the above information in the BSM.

According to an embodiment of the present disclosure, the BSM reported by the electronic device 100 may further include other information such as vehicle type information (car, passenger car, truck, and the like).

According to an embodiment of the present disclosure, the electronic device 100 may periodically send the vehicle information to the server. For example, the electronic device 100 may periodically send the BSM including the vehicle information to the server via the communication unit 130. According to an embodiment of the present disclosure, in a case where the electronic device 100 is applied to an autonomous vehicle, the electronic device 100 may periodically send the BSM including the vehicle information to an RSU (in a broadcast manner, for example), and then the RSU forwards the BSM to the server.

According to an embodiment of the present disclosure, the electronic device 100 may receive, from the server via the communication unit 130, request information for acquiring the vehicle information, and the generating unit 120 may generate the vehicle information in response to the request information and send the vehicle information to the server via the communication unit 130. Similarly, in a case where the electronic device 100 is applied to an autonomous vehicle, the electronic device 100 may receive the request information forwarded from the RSU, and send the BSM including the vehicle information to the RSU (in a broadcast manner, for example), so then the RSU forwards the BSM to the server.

As described above, according to an embodiment of the present disclosure, the electronic device 100 for a vehicle may send the vehicle information to the server, so that the server may determine road planning information based on the vehicle information. In this way, the weight information, the size information and/or the tire pressure information of the vehicle are considered by the server during road planning and decision planning, and therefore the road planning may be carried out more reasonably.

According to an embodiment of the present disclosure, the electronic device 100 may receive, from the server via the communication unit 130, limitation condition information of respective roads within coverage of the server. For example, the server may broadcast the limitation condition information of respective roads. In addition, the server may send the limitation condition information of respective roads to respective RSUs, and the RSUs broadcast the limitation condition information of respective roads, so that the electronic device 100 can receive the limitation condition information from the RSUs.

According to an embodiment of the present disclosure, the coverage of the electronic device 100 includes multiple roads, and the limitation condition information of a road may include a limitation condition about at least one parameter of the road. The parameter of a road includes, but is not limited to the length, width, height, weight, travel time, and travel speed. For example, the limitation condition on the length for a road may include a maximum length of a vehicle allowed to travel on the road; the limitation condition on the width for a road may include a maximum width of a vehicle allowed to travel on the road; the limitation condition on the height for a road may include a maximum height of a vehicle allowed to travel on the road; the limitation condition on the weight for a road may include a maximum weight of a vehicle allowed to travel on the road; the limitation condition on the travel time for a road may include allowable travel time for various types of vehicles to travel on the road; and the limitation condition on the speed for a road may include a maximum speed of a vehicle allowed to travel on the road. In addition, it is to be noted that the road here shall be considered in a broad definition, and bridges are also within the scope of the road.

According to an embodiment of the present disclosure, as shown in FIG. 1, the electronic device 100 may further include a determining unit 160 configured to determine, based on the received limitation condition information of respective roads, whether the vehicle exceeds the limitation condition on a currently planned road.

In other words, the electronic device 100 may determine the vehicle information through the weight determining unit 110, the tire pressure determining unit 140, and the size determining unit 150, and may determine whether the vehicle exceeds the limitation condition on a currently planned road based on the vehicle information. In other words, the electronic device 100 may not send the vehicle information to the server, but determine, based on the information, whether the vehicle exceeds the limitation condition on respective roads. Here, the determining unit 160 may determine, based on the vehicle information, whether the vehicle exceeds the limitation condition on each parameter of each currently planned road.

According to an embodiment of the present disclosure, the weight determining unit 110 may determine a current weight of the vehicle, and the determining unit 160 may determine that the vehicle exceeds the limitation condition for a certain road in a currently planned road in a case where the current weight of the vehicle exceeds a limitation condition on the weight for the rode. For another example, the size determining unit 150 may determine a length, a width, and a height of the vehicle, and the determining unit 160 may determine that the vehicle exceeds the limitation condition for a road in a case where the length, width, or height of the vehicle exceeds the limitation condition on the length, width, or height for the rode. In addition, the electronic device 100 may also predict the travel time and travel speed of the vehicle on respective roads, and the determining unit 160 may determine whether the travel time or travel speed of the vehicle exceeds the limitation conditions on the travel time or the travel speed for respective roads.

According to an embodiment of the present disclosure, as shown in FIG. 1, the electronic device 100 may further include a generating unit 170 configured to generate over-limit information in a case where the vehicle exceeds the limit condition on a currently planned road. The over-limit information may include, for example, roads on which the vehicle exceeds the limit condition. In an embodiment, the over-limit information may further include a parameter that exceeds the limit condition. In an embodiment, the over-limit information may further include a current value of the parameter that exceeds the limitation condition. For example, in a case where the vehicle exceeds the limit condition on the weight for a road A, the over-limit information may include an identifier of the road A. In an embodiment, the over-limit information may further include information indicating a weight parameter. In an embodiment, the over-limit information may further include the current weight of the vehicle.

According to an embodiment of the present disclosure, the electronic device 100 may send the over-limit information to the server via the communication unit 130, so that the server re-determines the road planning information for the vehicle. For example, the server may re-plan a road to avoid the road on which the vehicle exceeds the limitation condition. Further, the server may re-plan a road using a current value of the parameter of the vehicle that exceeds the limitation condition.

As described above, according to an embodiment of the present disclosure, the electronic device 100 for a vehicle may determine the vehicle information, and determine, based on the limitation condition information of respective roads sent from the server, whether the vehicle exceeds the limitation condition of a road on the planned route. In this way, the vehicle may send the over-limit information to the server in a case where the vehicle exceeds the limitation condition of a road on the planned route, and the server may re-determine the road planning information. In this way, a situation in which the vehicle exceeds the limitation condition of a road may be avoided, and therefore the road planning and decision planning may be carried out more reasonably.

When a motorcade is traveling, each vehicle in the motorcade may interact with the server in a manner as described above. In an embodiment, a head vehicle may collect vehicle information of each vehicle in the motorcade and interact with the server, which is described in detail below.

According to an embodiment of the present disclosure, when the electronic device 100 is applied to a head vehicle in a motorcade, the electronic device 100 may receive vehicle information of other vehicles in the motorcade from the other vehicles via the communication unit 130. The vehicle information of the other vehicles may include weight information of the other vehicles. The weight information of the other vehicles may include current weight of the other vehicles and/or maximum weights of the other vehicles.

According to an embodiment of the present disclosure, the generating unit 120 may generate vehicle information of the motorcade. The vehicle information of the motorcade may include the weight information of respective vehicles in the motorcade. Further, the electronic device 100 may send the vehicle information of the motorcade to the server via the communication unit 130, for the server to determine road planning information for the motorcade based on the vehicle information of the motorcade.

According to an embodiment of the present disclosure, the vehicle information of the other vehicles may further include tire pressure information of the other vehicles, and the vehicle information of the motorcade generated by the generating unit 120 may further include the tire pressure information of respective vehicles in the motorcade.

According to an embodiment of the present disclosure, the vehicle information of the other vehicles may further include size information of the other vehicles, including lengths, widths, and heights of the other vehicles. The vehicle information of the motorcade generated by the generating unit 120 may further include the size information of the motorcade, and the size information of the motorcade may include the size information of respective vehicles in the motorcade. In an embodiment, the size information of the motorcade may include the size information of respective vehicles in the motorcade and a gap between two adjacent vehicles. In an embodiment, the size information of the motorcade may include a length of the motorcade, a width of the motorcade, and a height of the motorcade. Here, the length of the motorcade refers to a total length of the motorcade (including the gap between vehicles), the width of the motorcade refers to the width of the vehicle with the largest width in the motorcade, and the height of the motorcade refers to the height of the vehicle with the largest height in the motorcade.

As mentioned above, the vehicle information of the motorcade generated by the generating unit 120 may include one or more of the weight information of respective vehicles in the motorcade, the tire pressure information of respective vehicles in the motorcade, and the size information of the motorcade.

As described above, according to an embodiment of the present disclosure, the electronic device 100 may send the vehicle information of the motorcade to the server, so that the server may determine road planning information based on the vehicle information of the motorcade. In this way, the weight information, size information and/or tire pressure information of the entire motorcade are considered by the server during road planning, and thereby the road planning may be carried out more reasonably.

According to an embodiment of the present disclosure, in a case where the electronic device 100 is applied to a head vehicle in the motorcade, the determining unit 160 may determine whether the motorcade exceeds a limitation conditions on a currently planned road based on the received limitation condition information of respective roads. For example, the determining unit 160 may determine whether each vehicle in the motorcade exceeds the limitation condition of respective roads. Further, in a case where any vehicle in the motorcade exceeds the limitation condition of a road, the generating unit 170 may generate and send the over-limit information to the server, so that the server re-determines the road planning information for the motorcade.

In addition, according to an embodiment of the present disclosure, in view of the weight, the determining unit 160 may determine a total weight and the number of vehicles traveling on a certain road at the same time based on the gap between the vehicles, and thereby determine whether the total weight of the vehicles traveling at the same time exceeds the limitation condition on the weight for the road. Further, in a case where the weight of each vehicle does not exceed the limitation condition on the weight for the road, and the total weight of the vehicles traveling at the same time exceeds limitation condition on the weight for the road, the electronic device 100 may adjust the gap between the vehicles in order to solve the problem.

As described above, according to an embodiment of the present disclosure, the electronic device 100 applied to the head vehicle may determine the vehicle information of the motorcade, and determine, based on the limitation condition information of respective roads sent from the server, whether the motorcade exceeds a limitation condition on a road in the planned route. In this way, in a case where a vehicle in the motorcade exceeds the limitation condition on the road in the planned route, the vehicle may send over-limit information to the server, and the server may re-determine the road planning information. In this way, a situation in which a vehicle exceeds the limitation condition on a road may be avoided, and therefore the road planning may be carried out more reasonably.

2. Configuration Example of Electronic Device for a Server

Figure 2:
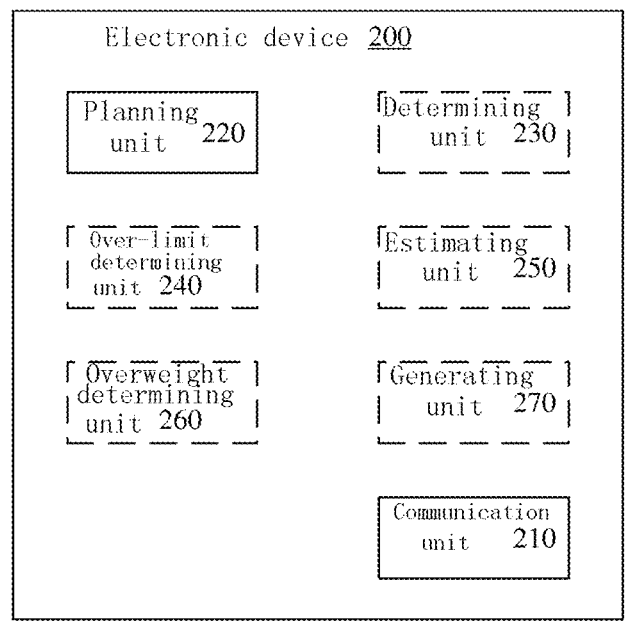
FIG. 2 is a block diagram showing an exemplary configuration of an electronic device for a server according to an embodiment of the present disclosure.

FIG. 2 is a block diagram showing a structure of an electronic device 200 for a server in a wireless communication system according to an embodiment of the present disclosure. Here, the electronic device 200 may be located on a network side or in the cloud. Further, in an automatic driving system, the electronic device 200 may be located in an RSS, and may communicate with the vehicle via the RSU. The RSS is arranged on a roadside or a remote computer room, and the RSU is arranged on the roadside.

As shown in FIG. 2, the electronic device 200 may include a communication unit 210 and a planning unit 220.

Here, each unit of the electronic device 200 may be included in a processing circuit. It should be noted that the electronic device 200 may include a single processing circuit or multiple processing circuits. Further, the processing circuit may include various discrete functional units to perform various different functions and/or operations. It should be noted that these functional units may be physical entities or logical entities, and units with different titles may be implemented by a same physical entity.

According to an embodiment of the present disclosure, in a case where the electronic device 200 is arranged in an RSS, the planning unit 220, a determining unit 230, an over-limit determining unit 240, an estimating unit 250, an overweight determining unit 260, and a generation unit 270 of the electronic device 200 may be integrated in a roadside computing control unit of the RSS.

According to an embodiment of the present disclosure, the electronic device 200 may receive vehicle information from a vehicle via the communication unit 210. The vehicle information includes weight information of the vehicle.

According to an embodiment of the present disclosure, the planning unit 220 may determine road planning information for the vehicle based on the vehicle information. The road planning information here may include a route planning for the vehicle, for example, the route traveled from the current location to a destination location. In an embodiment, in a case where the vehicle is an autonomous vehicle, the road planning information may further include decision planning, which may include behavioral decisions (to travel forward, stop, turn left, turn right, change a lane, and the like), a corresponding lane, an action decision (path planning, speed, angle, and the like), moving track point and a time for arriving the track point, and other information.

According to an embodiment of the present disclosure, the electronic device 200 may send the road planning information for the vehicle to the vehicle via the communication unit 210.

It can be seen that, the electronic device 200 according to the present disclosure may receive, from a vehicle, vehicle information including weight information of the vehicle, and determine road planning information based on the vehicle information. In this way, the weight information of the vehicle is considered during road planning, and thereby weight of the vehicle may be better managed and the road planning may be carried out more reasonably.

According to an embodiment of the present disclosure, the electronic device 200 may receive, from the vehicle, a BSM carrying the vehicle information. Further, the weight information may include a current weight of the vehicle and/or a maximum weight of the vehicle. In addition, the vehicle information may include tire pressure information of the vehicle and/or size information of the vehicle. The size information of the vehicle includes a length, a width, and a height of the vehicle.

According to an embodiment of the present disclosure, the electronic device 200 may periodically receive the BSM including the vehicle information from the vehicle via the communication unit 210. In an embodiment, the electronic device 200 may send request information for acquiring the vehicle information to the vehicle when need to obtain the vehicle information or BSM, and receive, via the communication unit 210, the vehicle information sent from the vehicle in response to the request information. As described above, the electronic device 200 may send request information to the vehicle via the RSU, and receive the BSM from the vehicle via the RSU.

According to an embodiment of the present disclosure, as shown in FIG. 2, the electronic device 200 may further include a determining unit 230 configured to determine limitation condition information of respective roads within coverage of the electronic device 200. The limitation condition information of a road includes a limitation condition about at least one parameter of the road. In other words, the determining unit 230 may determine the limitation condition information of each of multiple roads within the coverage of the electronic device 200, and the limitation condition information of each road may include limitation condition about one or more parameters of the road. As mentioned above, the parameter of a road includes, but is not limited to the length, width, height, weight, travel time, and travel speed. For example, the limitation condition on the length for a road may include a maximum length of a vehicle allowed to travel on the road; the limitation condition on the width for a road may include a maximum width of a vehicle allowed to travel on the road; the limitation condition on the height for a road may include a maximum height of a vehicle allowed to travel on the road; the limitation condition on the weight for a road may include a maximum weight of a vehicle allowed to travel on the road; the limitation condition on the travel time for a road may include allowable travel time for various types of vehicles to travel on the road; and the limitation condition on the speed for a road may include a maximum speed of a vehicle allowed to travel on the road. In addition, it is to be noted that the road here shall be considered in a broad definition, and bridges are also within the scope of the road.

According to an embodiment of the present disclosure, as shown in FIG. 2, the electronic device 200 may further include an over-limit determining unit 240 configured to determine whether the vehicle exceeds the limitation condition of respective roads based on the received vehicle information.

According to an embodiment of the present disclosure, the over-limit determining unit 240 may determine whether the vehicle exceeds respective limitation conditions of respective roads. For example, the over-limit determining unit 240 may determine whether the vehicle exceeds the limitation condition on the weight for a road based on the current weight of the vehicle included in the vehicle information. Furthermore, the over-limit determining unit 240 may determine the current weight of the vehicle based on the tire pressure information included in the vehicle information, and thereby determine whether the vehicle exceeds the limitation condition on the weight for respective roads. That is to say, tire pressure is an auxiliary means for determining the weight, and the over-limit determining unit 240 may determine the current weight of the vehicle based on a combination of the received current weight and tire pressure, in order to avoid inaccuracy of information due to poor channel quality, concealment by a driver, or the like. For another example, the over-limit determining unit 240 may determine whether the vehicle exceeds the limitation on the length for a road based on the length of the vehicle included in the vehicle information, and determine whether the vehicle exceeds the limitation on the length for the road based on the width of the vehicle included in the vehicle information, and determine whether the vehicle exceeds the limitation on the height for the road based on the height of the vehicle included in the vehicle information, and the like.

According to an embodiment of the present disclosure, the planning unit 220 may determine, based on a determination result by the over-limit determining unit 240, road planning information for the vehicle to avoid a road on which the vehicle exceeds the limitation condition for the road. For example, in a case where the over-limit determining unit 240 determines that the vehicle exceeds the limitation condition on any parameter of a road, the planning unit 220 may perform road planning to exclude the road from a route for the vehicle.

According to an embodiment of the present disclosure, as shown in FIG. 2, the electronic device 200 may further include an overweight determining unit 260 configured to determine whether the vehicle is overweight based on the current weight of the vehicle and the maximum weight of the vehicle. Similarly, the overweight determining unit 260 may determine the current weight of the vehicle in combination with the tire pressure information included in the vehicle information, in order to avoid inaccuracy of the current weight due to poor channel quality, concealment by the driver, or the like.

In a further embodiment, the electronic device 200 may further include a generating unit 270 configured to generate warning information in a case where the overweight determining unit 260 determines that the vehicle is overweight. For example, the warning information may include an illegal behavior (overweight) of the vehicle and identification information (license number) of the vehicle. In an embodiment, the warning information may further include current location information and/or travel route information of the vehicle. Further, the electronic device 200 may send the generated warning information to a traffic management department via the communication unit 210.

According to an embodiment of the present disclosure, the electronic device 200 may determine whether the vehicle has illegal behaviors in addition to being overweight. For example, the electronic device 200 may determine whether the vehicle is speeding based on a current speed of the vehicle, determine whether the vehicle has travelling in a dangerous manner based on the tire pressure of tires of the vehicle, and determine, based on the height of the vehicle, whether the vehicle exceeds a safety height regarding a type of vehicles and thereby is dangerous, and the like. In a case where the electronic device 200 determines that the vehicle has an illegal behavior, the electronic device 200 may generate the warning information and send it to a traffic management department.

As described above, according to the embodiments of the present disclosure, in a case where the electronic device 200 receives the vehicle information from the vehicle, the electronic device 200 may determine the road planning information based on the received vehicle information, so that one or more of the weight, size, and tire pressure of the vehicle may be considered during road planning, and thereby the road planning and decision planning may be carried out more reasonably. Furthermore, the electronic device 200 may further determine whether the vehicle has an illegal behavior based on the received vehicle information, and report the illegal behavior of the vehicle to a traffic management department for processing, in order to better regulate driving of the vehicle.

According to an embodiment of the present disclosure, as shown in FIG. 2, the electronic device 200 may further include an estimating unit 250 configured to estimate the vehicle information of the vehicle. The vehicle information may include at least one of the weight information of the vehicle, the size information of the vehicle and the tire pressure information of the vehicle.

According to an embodiment of the present disclosure, the electronic device 200 may obtain information of the vehicle through a sensing device, and estimate the vehicle information based on the sensed information. The sensing device refers to a device capable of sensing, such as a roadside sensing device in the RSS system, which includes but is not limited to laser radar, camera, millimeter wave radar and other devices. The sensing device may collect raw perception data, such as an image, video, point cloud, rain and fog condition, and the like, within current coverage in real time, and transmit the data to the electronic device 200. For example, the size of the vehicle, including a length, width, and height, may be sensed through the sensing device. For another example, images of tires of the vehicle may be captured by a camera, so as to determine the tire pressure information of the tires. Further, the estimating unit 250 may estimate the current weight of the vehicle based on the tire pressure information of respective tires. In addition, the estimating unit 250 may estimate a model of the vehicle based on the size of the vehicle and the image of the vehicle, and thereby estimate the maximum weight of the vehicle, and so on.

According to an embodiment of the present disclosure, the over-limit determining unit 240 may determine whether the vehicle exceeds the limitation condition of respective roads based on the estimated vehicle information. In addition, the overweight determining unit 260 may determine whether the vehicle has an illegal behavior based on the estimated vehicle information, for example, determine whether the vehicle is overweight based on the current weight of the vehicle and the maximum weight of the vehicle. Therefore, the planning unit 220 may determine the road planning information based on the determination result by the overweight determining unit 240, and the generating unit 270 may generate warning information based on the determination result by the overweight determining unit 260.

It can be seen that, according to the embodiments of the present disclosure, in a case where the electronic device 200 fails to receive the vehicle information from the vehicle, the electronic device 200 may estimate the vehicle information and perform road planning more reasonably considering one or more of the estimated weight, size and tire pressure. Furthermore, the electronic device 200 may further determine whether the vehicle has an illegal behavior based on the estimated vehicle information, and report the illegal behavior of the vehicle to a traffic management department for processing, in order to better regulate driving of the vehicle. According to an embodiment of the present disclosure, even if the electronic device 200 receives the vehicle information from the vehicle, the electronic device 200 may estimate the vehicle information and determine a final vehicle information based on the received vehicle information and the estimated vehicle information, so that the determined vehicle information is more accurate, which may avoid inaccuracy of the vehicle information due to poor channel quality, concealment by the driver, or the like.

According to an embodiment of the present disclosure, after the determining unit 230 determines the limitation condition information of respective roads within coverage of the electronic device 200, the electronic device 200 may send the limitation condition information of respective roads within coverage of the electronic device 200 via the communication unit 210. For example, the electronic device 200 may send the limitation condition information of respective roads in a broadcast manner. Further, the electronic device 200 may send the limitation condition information of respective roads to RSUs, so that the RSU s may broadcast the limitation condition information of respective roads. Next, after the vehicle receives the limitation condition information, the vehicle may determine whether the vehicle exceeds a limitation condition on a currently planned road based on the limitation condition information of the road, and may send over-limit information to the electronic device 200 in a case where the vehicle exceeds the limitation condition on the currently planned road.

According to an embodiment of the present disclosure, the electronic device 200 may receive, from the vehicle via the communication unit 210, over-limit information indicating that the vehicle exceeds the limitation condition on a currently planned road. The over-limit information may include, for example, identification of the road on which the vehicle exceeds the limit condition. In an embodiment, the over-limit information may further include the parameter that exceeds the limit condition. In an embodiment, the over-limit information may further include a current value of the parameter that exceeds the limit condition. For example, in a case where the vehicle exceeds the limitation condition on the weight for road A, the over-limit information received by the electronic device 200 may include an identification of road A; in an embodiment, the over-limit information may further include information indicating the weight parameter; and in an embodiment, the over-limit information may further include a current weight of the vehicle.

According to an embodiment of the present disclosure, the planning unit 220 may re-determine the road planning information for the vehicle based on the received over-limit information. For example, the planning unit 220 may re-plan roads for the vehicle to avoid a road on which the vehicle exceeds the limitation condition.

As described above, according to an embodiment of the present disclosure, the electronic device 200 may send the limitation condition information of respective roads, and thereby determine, on a vehicle side, whether the vehicle exceeds a limitation condition of respective roads. In this case, it is less possible for the vehicle to determine whether the vehicle has an illegal behavior and report the illegal behavior, if any, to a traffic management department, and therefore the electronic device 200 may also determine whether the vehicle has an illegal behavior by estimating the vehicle information.

According to an embodiment of the present disclosure, in a case of a motorcade, the electronic device 200 may receive vehicle information of the motorcade from a head vehicle via the communication unit 210. The vehicle information of the motorcade may include, for example, weight information of respective vehicles in the motorcade. In this case, the planning unit 220 may determine road planning information for the motorcade based on the vehicle information of the motorcade, and may send the road planning information for the vehicle to the head vehicle via the communication unit 210.

In an embodiment, the vehicle information of the motorcade may further include tire pressure information of respective vehicles in the motorcade. In an embodiment, the vehicle information of the motorcade may further include size information of the motorcade. The size information of the motorcade may include the size information of respective vehicles in the motorcade. In an embodiment, the size information of the motorcade may include the size information of respective vehicles in the motorcade and a gap between two adjacent vehicles. In an embodiment, the size information of the motorcade may further include a length, a width, and a height of the motorcade. Here, the length of the motorcade refers to a total length of the motorcade (including the gap between vehicles), the width of the motorcade refers to the width of the vehicle with the largest width in the motorcade, and the height of the motorcade refers to the height of the vehicle with the largest height in the motorcade. As described above, the vehicle information of the motorcade may include one or more of the weight information of respective vehicles in the motorcade, the tire pressure information of respective vehicles in the motorcade, and the size information of the motorcade.

According to an embodiment of the present disclosure, the electronic device 200 may determine whether respective vehicles in the motorcade has an illegal behavior, and send warning information to a traffic management department if any one of the vehicles has an illegal behavior. In addition, the electronic device 200 may determine whether a vehicle in the motorcade exceeds a limitation condition of respective roads, and avoid the road during planning in a case where any one of the vehicles exceeds the limitation condition of the road. In particular, in view of the weight, the electronic device 200 may determine, according to the gap between the vehicles, the number of the vehicles traveling on a certain road at a same time and a total weight of such vehicles, and thereby determine whether the total weight of the vehicles traveling at the same time exceeds the limitation on the weight for the road. Further, in a case where the weight of respective vehicles does not exceed the limitation condition on the weight for the road, and the total weight of the vehicles traveling at the same time exceeds the limitation condition on the weight for the road, the electronic device 200 may send to the head vehicle a notification of adjusting the gap between the vehicles.

As described above, according to an embodiment of the present disclosure, the electronic device 200 may determine whether a vehicle in the motorcade exceeds the limitation condition of respective roads, and thereby determine road planning information. In this way, a situation in which the vehicle exceeds the limitation condition of a road may be avoided, and thereby the road planning and decision planning may be carried out more reasonably.

FIG. 3 to FIG. 6 are signaling flowcharts each illustrating a road planning process according to an embodiment of the present disclosure. In FIG. 3 to FIG. 6, the vehicle may include the electronic device 100, the RSS may include the electronic device 200, and the vehicle and the RSS may communicate via the RSU. In an alternative embodiment, the electronic device 100 in the vehicle may directly communicate with the electronic device 200.

Figure 3:
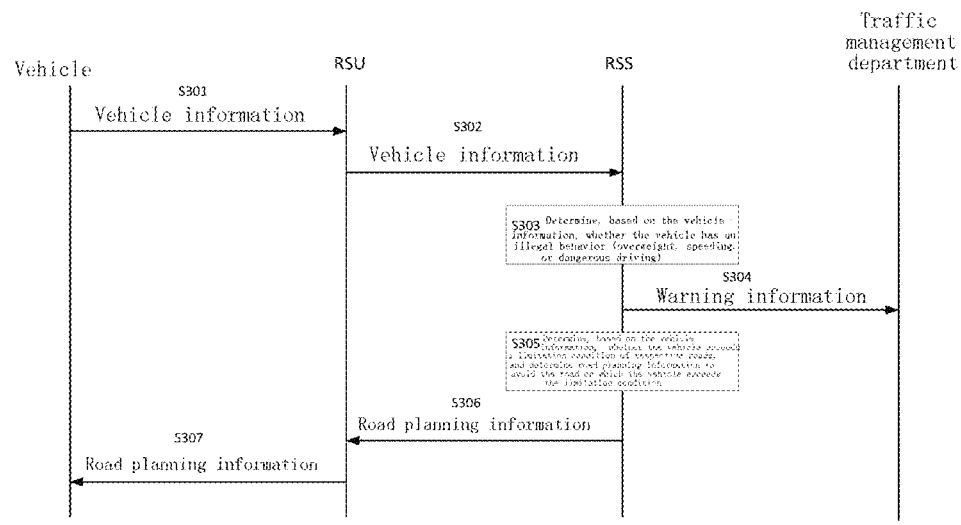
FIG. 3 is a signaling flowchart showing a road planning process according to an embodiment of the present disclosure.

As shown in FIG. 3, in step S301, vehicle information is sent from the vehicle to the RSU. Next, in step S302, the vehicle information is forwarded by the RSU to the RSS. Next, in step S303, it is determined, by the RSS, whether the vehicle has an illegal behavior such as overweight, speeding, or dangerous driving, based on the received vehicle information. Next, in a case where the RSS determines that the vehicle has an illegal behavior in step S303, warning information is sent in step S304 by the RSS to a traffic management department. In step S305, it may be determined, by the RSS, whether the vehicle exceeds a limitation condition of respective roads based on the received vehicle information, and a road planning is performed by the RSS to avoid the road on which the vehicle exceeds the limitation condition.

Next, in step S306, road planning information is send by the RSS to the RSU. Next, in step S307, the road planning information is forwarded from the RSU to the vehicle. In this way, according to the embodiment of the present disclosure, the RSS may determine, based on the vehicle information reported from the vehicle, whether the vehicle has an illegal behavior and whether the vehicle exceeds the limitation condition of respective roads, and thereby perform a road planning. In FIG. 3, step S303 and step S305 may be performed in parallel.

Figure 4:
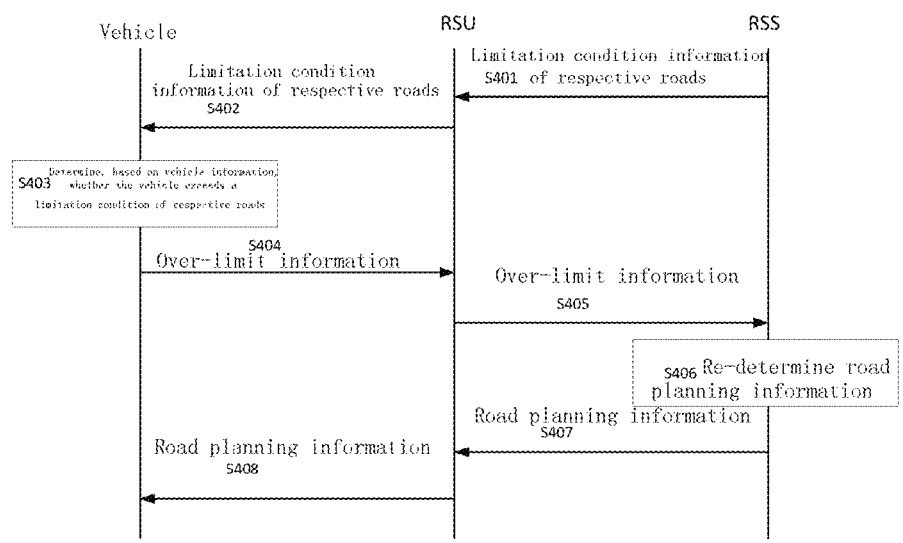
FIG. 4 is a signaling flowchart showing a road planning process according to another embodiment of the present disclosure.

As shown in FIG. 4, in step S401, limitation condition information of respective roads within coverage of the RSS is send by the RSS to the RSU. Next, in step S402, the limitation condition information of respective roads is sent by the RSU in a broadcast manner. Next, in step S403, it is determined, by the vehicle, whether the vehicle exceeds a limitation condition of respective roads on a currently planned road based on the received limitation condition information of respective roads and the vehicle information. Next, in a case where it is determined in step S403 that the vehicle exceeds the limitation condition of a road, over-limit information is sent by the vehicle to the RSU in step S404. Next, in step S405, the over-limit information is sent by the RSU to the RSS. Next, in step S406, the road planning information is re-determined by the RSS based on the received over-limit information. Next, in step S407, the road planning information is sent by the RSS to the RSU. Next, in step S408, the road planning information is forwarded by the RSU to the vehicle. Therefore, according to the embodiment of the present disclosure, the vehicle may determine whether a vehicle exceeds a limitation condition of a road based on the received limitation condition information of respective roads, report to the RSS in a case where a limitation condition of a road is exceeded, and thereby re-perform a road planning.

Figure 5:
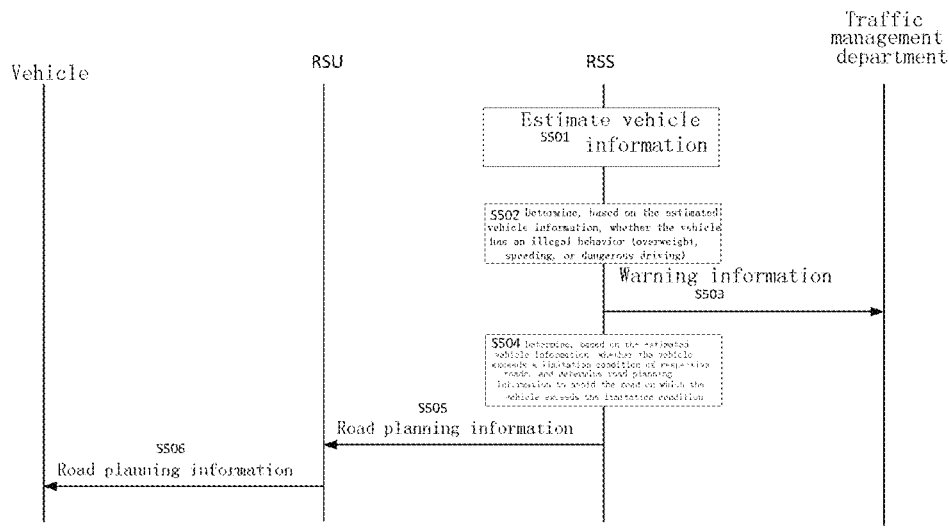
FIG. 5 is a signaling flowchart showing a road planning process according to yet another embodiment of the present disclosure.

As shown in FIG. 5, vehicle information is estimated by an RSS in step S501. Next, in step S502, it is determined, by the RSS, whether the vehicle has an illegal behavior such as overweight, speeding, or dangerous driving, based on the estimated vehicle information. Next, in a case where the RSS determines in step S502 that the vehicle has an illegal behavior, warning information is sent by the RSS to a traffic management department in step S503. In step S504, it is determined, by the RSS based on the estimated vehicle information, whether the vehicle exceeds a limitation condition of respective roads, and a road planning is carried out by the RSS in order to avoid the roads on which the vehicle exceeds the limitation condition. Next, in step S505, road planning information is sent by the RSS to the RSU. Next, in step S506, the road planning information is forwarded by the RSU to the vehicle. Thus, according to the embodiment of the present disclosure, the RSS may estimate vehicle information, and determine, based on the estimated vehicle information, whether the vehicle has an illegal behavior and whether the vehicle exceeds a limitation condition of respective roads, and thereby perform a road planning. In FIG. 5, step S502 and step S504 may be performed in parallel.

Figure 6:
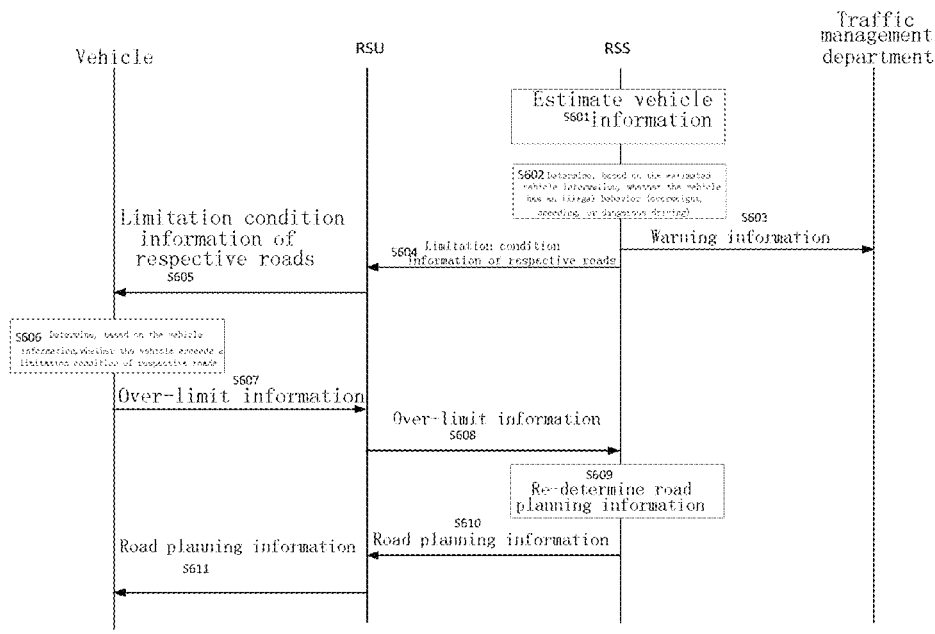
FIG. 6 is a signaling flowchart showing a road planning process according to yet another embodiment of the present disclosure.

As shown in FIG. 6, vehicle information is estimated by the RSS in step S601. Next, in step S602, it is determined, by the RSS, whether the vehicle has an illegal behavior such as overweight, speeding, or dangerous driving, based on the estimated vehicle information. Next, in a case where the RSS determines in step S602 that the vehicle has an illegal behavior, warning information is sent by the RSS to a traffic management department in step S603. Next, in step S604, limitation condition information of respective roads within coverage of the RSS is sent by the RSS to the RSU. Next, in step S605, the limitation condition information of respective roads is broadcasted by RSU. Next, in step S606, it is determined, by the vehicle based on the received limitation condition information of respective roads and the vehicle information, whether the vehicle exceeds a limitation condition of respective roads on a currently planned road. Next, in a case where the vehicle determines in step S606 that the vehicle exceeds the limitation condition of a road, over-limit information is sent by the vehicle to the RSU in step S607. Next, in step S608, the over-limit information is sent by the RSU to the RSS. Next, in step S609, road planning information is re-determined by the RSS based on the received over-limit information. Next, in step S610, the road planning information is sent by the RSS to the RSU. Next, in step S611, the road planning information is forwarded by the RSU to the vehicle. Therefore, according to the embodiment of the present disclosure, the vehicle may determine whether the vehicle exceeds a limitation condition of a road based on the received limitation condition information of respective roads, and report to the RSS in a case where the vehicle exceeds the limitation condition of a road, and the RSS may perform the road planning again. In addition, the RSS may determine whether the vehicle has an illegal behavior based on the estimated vehicle information and report to a traffic management department if the vehicle has an illegal behavior. In FIG. 6, step S602 and step S606 may be performed in parallel.

The electronic device 200 according to the embodiments of the present disclosure is described in detail as above. The electronic device 100 according to the embodiments of the present disclosure may be applied to a vehicle, that is, the electronic device 200 may service the electronic device 100. Therefore, all the embodiments about the electronic device 100 described before are applicable thereto.

3. Method Embodiments

A wireless communication method performed by the electronic device 100 in a wireless communication system according to an embodiment of the present disclosure is described in detail as follows.

Figure 7:
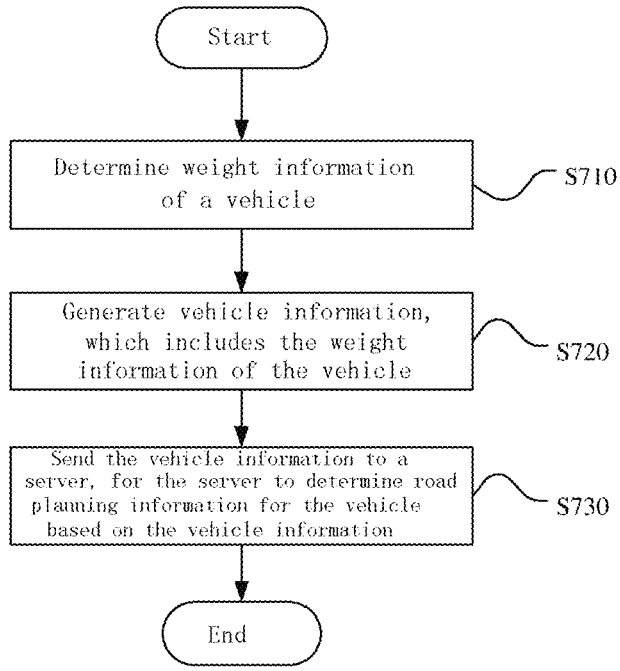
FIG. 7 is a flowchart showing a wireless communication method performed by an electronic device for a vehicle according to an embodiment of the present disclosure.

FIG. 7 is a flowchart illustrating a wireless communication method performed by the electronic device 100 in a wireless communication system according to an embodiment of the present disclosure.

As shown in FIG. 7, in step S710, weight information of a vehicle is determined.

Next, in step S720, vehicle information is generated, including the weight information of the vehicle.

Next, in step S730, the vehicle information is sent to a server, for the server to determine road planning information for the vehicle based on the vehicle information.

In a preferred embodiment, the weight information includes a current weight of the vehicle and/or a maximum weight of the vehicle.

In a preferred embodiment, the wireless communication method further includes: determining tire pressure information of the vehicle; and including the tire pressure information of the vehicle in the vehicle information.

In a preferred embodiment, the wireless communication method further includes: determining size information of the vehicle, which includes a length, a width, and a height of the vehicle; and including the size information of the vehicle in the vehicle information.

In a preferred embodiment, the wireless communication method further includes: carrying the vehicle information using a basic safety messages.

In a preferred embodiment, the wireless communication method further includes: periodically sending the vehicle information to the server.

In a preferred embodiment, the wireless communication method further includes: receiving, from the server, request information for acquiring the vehicle information; and sending the vehicle information to the server in response to the request information.

In a preferred embodiment, the wireless communication method further includes: receiving, from the server, limitation condition information of respective roads within coverage of the server, where the limitation condition information of respective roads includes limitation information about at least one parameter of the road; and determining, based on the limitation condition information of respective roads, whether the vehicle exceeds a limitation condition on a currently planned road.

In a preferred embodiment, the wireless communication method further includes: sending over-limit information to the server in a case where the vehicle exceeds the limitation condition on the currently planned road, such that the server re-determines road planning information for the vehicle.

In a preferred embodiment, the wireless communication method further includes: receiving, from other vehicles in a motorcade where the vehicle is used as a head vehicle, weight information of the other vehicles; generating vehicle information of the motorcade, which includes weight information of respective vehicles in the motorcade; and sending the vehicle information of the motorcade to the server, for the server to determine road planning information for the motorcade according to the vehicle information of the motorcade.

In a preferred embodiment, the wireless communication method further includes: receiving, from the other vehicles, tire pressure information of the other vehicles; and including the tire pressure information of respective vehicles in the motorcade in the vehicle information of the motorcade.

In a preferred embodiment, the wireless communication method further includes: receiving, from the other vehicles, size information of the other vehicles, which includes the length, width, and height of each of the other vehicles; and including, in the vehicle information of the motorcade, a total length of the motorcade, a maximum width of the motorcade, and a maximum height of the motorcade.

In a preferred embodiment, the vehicle is an autonomous vehicle, and the server is located in a road sub-system RSS, and the wireless communication method further includes communicating with the server via an RSU.

According to the embodiments of the present disclosure, the subject that performs the above-mentioned method may be the electronic device 100 according to the embodiments of the present disclosure, and thus the embodiments regarding the electronic device 100 are all applicable thereto.

A wireless communication method performed by the electronic device 200 in a wireless communication system according to an embodiment of the present disclosure is described in detail below.

Figure 8:
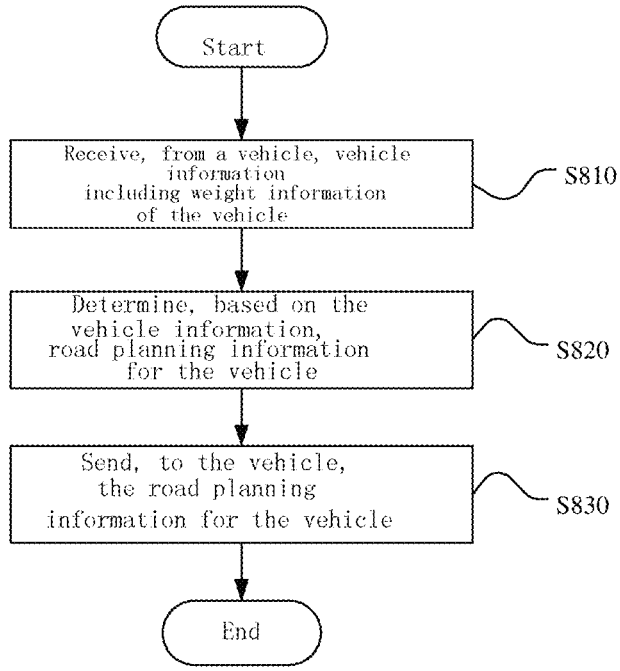
FIG. 8 is a flowchart showing a wireless communication method performed by an electronic device for an RSS according to an embodiment of the present disclosure.

FIG. 8 is a flowchart illustrating a wireless communication method performed by the electronic device 200 in a wireless communication system according to an embodiment of the present disclosure.

As shown in FIG. 8, in step S810, vehicle information is received from a vehicle, and the vehicle information includes weight information of the vehicle.

Next, in step S820, road planning information for the vehicle is determined based on the vehicle information.

Next, in step S830, the road planning information for the vehicle is sent to the vehicle.

In a preferred embodiment, the weight information includes a current weight of the vehicle and/or a maximum weight of the vehicle.

In a preferred embodiment, the vehicle information further includes tire pressure information of the vehicle and/or size information of the vehicle, and the size information of the vehicle includes a length, width, and height of the vehicle.

In a preferred embodiment, the wireless communication method further includes: periodically receiving vehicle information from the vehicle.

In a preferred embodiment, the wireless communication method further includes: sending, to the vehicle, request information for acquiring the vehicle information; and receiving the vehicle information sent from the vehicle in response to the request information.

In a preferred embodiment, the wireless communication method further includes: determining limitation condition information of respective roads within coverage of the electronic device, where the limitation condition information of a road includes a limitation condition about at least one parameter of the road; determining, based on the received vehicle information, whether the vehicle exceeds the limitation condition of a road; and determining road planning information for vehicles to avoid a road on which the vehicle exceeds the limitation condition.

In a preferred embodiment, the wireless communication method further includes: determining limitation condition information of respective roads within coverage of the electronic device, where the limitation condition information of a road includes a limitation condition about at least one parameter of the road; estimating the vehicle information of the vehicle, where the vehicle information includes at least one of the weight information of the vehicle, size information of the vehicle, and tire pressure information of the vehicle; determining, based on the estimated vehicle information, whether the vehicle exceeds the limitation condition of a road; and determining the road planning information for the vehicle to avoid a road on which the vehicle exceeds the limitation condition.

In a preferred embodiment, the wireless communication method further includes: determining that the vehicle exceeds the limitation condition of a road in a case where a current weight of the vehicle exceeds the limitation condition of the weight on the road.

In a preferred embodiment, the wireless communication method further includes: determining whether the vehicle is overweight based on the received current weight of the vehicle and the maximum weight of the vehicle; and generating warning information in a case where the vehicle is overweight.

In a preferred embodiment, the wireless communication method further includes: estimating a current weight of the vehicle and a maximum weight of the vehicle; determining whether the vehicle is overweight based on the estimated current weight of the vehicle and the maximum weight of the vehicle; and generating warning information in a case where the vehicle is overweight.

In a preferred embodiment, the wireless communication method further includes: sending limitation condition information of respective roads within coverage of the electronic device, for the vehicle to determine whether the vehicle exceeds a limitation condition on a currently planned road according to the limitation condition information of respective roads, where the limitation condition information of a road includes a limitation condition about at least one parameter of the road.

In a preferred embodiment, the wireless communication method further includes: receiving, from the vehicle, over-limit information indicating that the vehicle exceeds the limit condition on the currently planned road; and re-determining the road planning information for the vehicle based on the over-limit information.

In a preferred embodiment, the wireless communication method further includes: receiving vehicle information of a motorcade from a head vehicle in the motorcade, where the vehicle information of the motorcade includes weight information of respective vehicles in the motorcade; determining road planning information for the motorcade based on the vehicle information of the motorcade; and sending the road planning information for the vehicle to the head vehicle.

In a preferred embodiment, the vehicle information of the motorcade further includes tire pressure information of respective vehicles in the motorcade; and/or a total length of the motorcade, a maximum width of the motorcade, and a maximum height of the motorcade.

In a preferred embodiment, the electronic device is located in an RSS, the vehicle is an autonomous vehicle, and the wireless communication method further includes communicating with the vehicle via an RSU.

According to the embodiments of the present disclosure, the subject that performs the above-mentioned method may be the electronic device 200 according to the embodiments of the present disclosure, and therefore the foregoing embodiments regarding the electronic device 200 are all applicable thereto.

4. Application Example

The technology in the present disclosure may be applied to various products.

The electronic device 200 may be implemented as any type of server, such as a tower server, a rack server, and a blade server. The electronic device 200 may be a control module mounted on a server (such as an integrated circuitry module including a single die, and a card or blade inserted into a slot of a blade server). Further, the electronic device 200 may be located in an RSS, and may be implemented through a roadside computing control unit in the RSS, for example.

The electronic device 100 may be implemented as being used for a vehicle, such as a terminal device arranged or integrated in the vehicle. The terminal device may be implemented as a mobile terminal (such as a smart phone, a tablet personal computer (PC), a notebook PC, a portable game terminal, a portable/dongle mobile router, and a digital camera device), or an in-vehicle terminal (such as a car navigation apparatus). Furthermore, the terminal device may be a wireless communication module (such as an integrated circuit module including a single wafer) mounted on each of the above terminal devices.

<Application Example of a Server>

Figure 9:
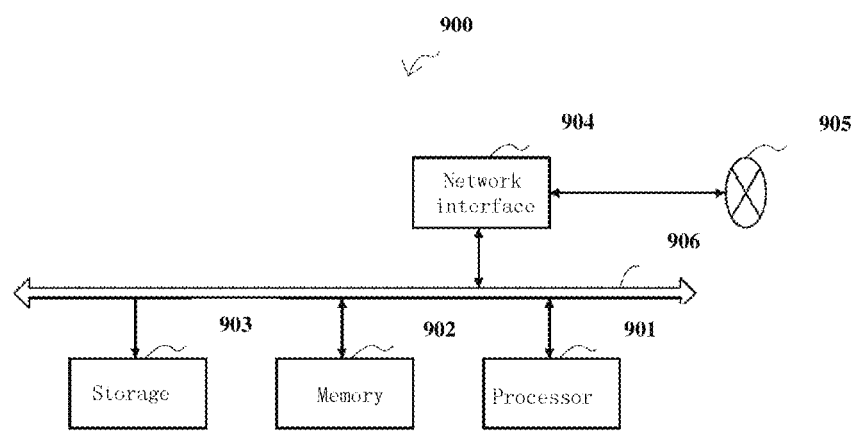
FIG. 9 is a block diagram showing an example of a server that can implement the electronic device 200 according to the present disclosure.

FIG. 9 is an exemplary block diagram of a server 900 to which the technology according to the present disclosure may be applied. The server 900 includes a processor 901, a memory 902, a storage 903, a network interface 904, and a bus 906.

The processor 901 may be, for example, a central processing unit (CPU) or a digital signal processor (DSP), and controls functions of the server 900. The memory 902 includes a random access memory (RAM) and a read-only memory (ROM), and stores data and a program executed by the processor 901. The storage 903 may include a storage medium, such as a semiconductor memory and a hard disk.

The network interface 904 is a wired communication interface for connecting the server 900 to a wired communication network 905. The wired communication network 905 may be a core network such as an Evolved Packet Core (EPC), or a packet data network (PDN) such as the Internet.

The bus 906 connects the processor 901, the memory 902, the storage 903, and the network interface 944 to each other. The bus 906 may include two or more buses having different speeds (such as a high-speed bus and a low-speed bus).

In the server 900 shown in FIG. 9, the planning unit 220, the determining unit 230, the over-limit determining unit 240, the estimating unit 250, the overweight determining unit 260 and the generating unit 270 described with reference to FIG. 2 may be implemented by the processor 901, and the communication unit 210 described with reference to FIG. 2 may be implemented by the network interface 904. For example, the processor 901 may perform functions of road planning and decision making, determining limitation conditions of respective roads, determining whether a vehicle exceeds a limitation condition of a road, estimating vehicle information, determining whether a vehicle has an illegal behavior such as being overweight, and generating warning information, by executing instructions stored in the memory 902 or storage 903.

<Application Example of an Electronic Device for a Vehicle>

Figure 10:
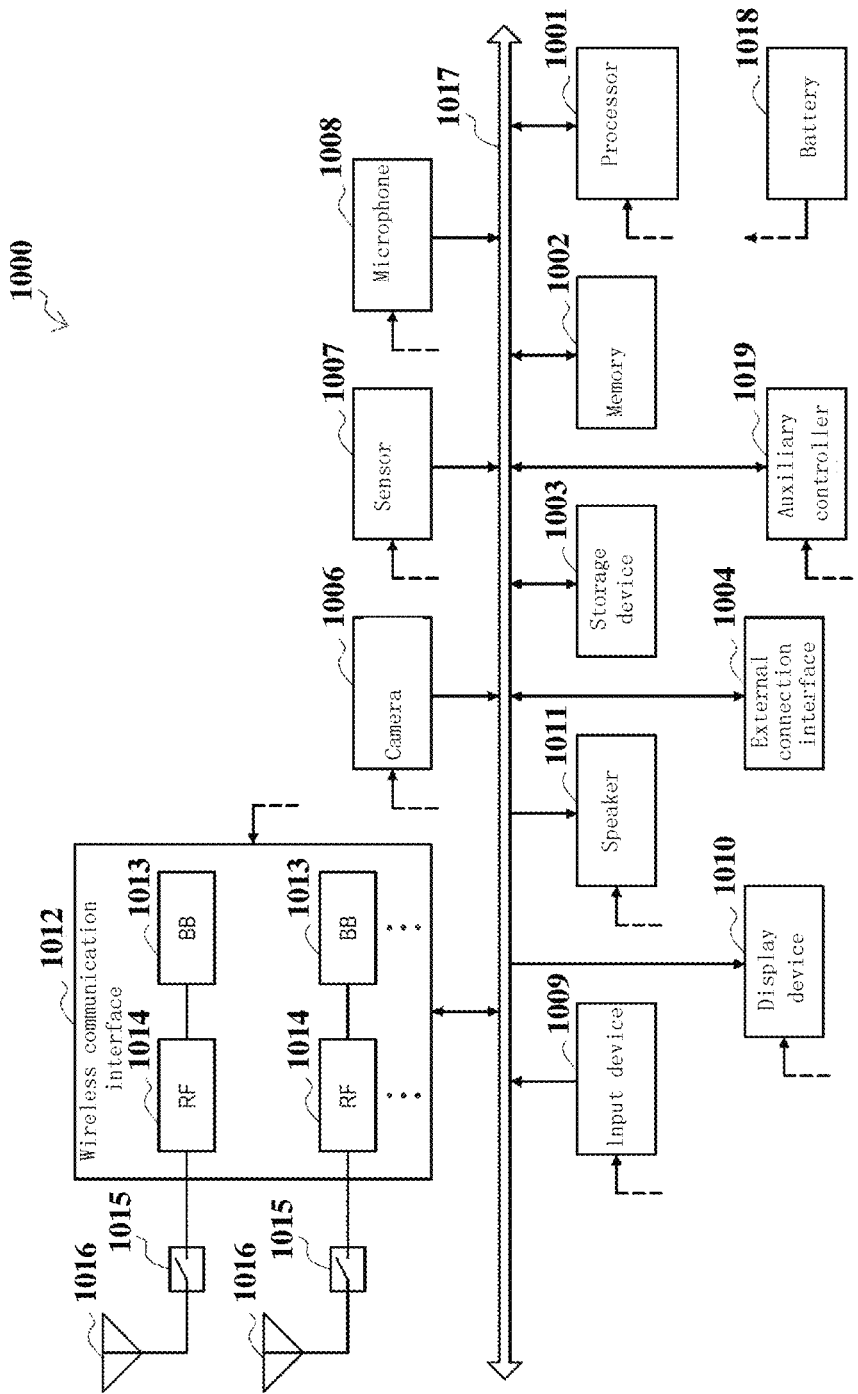
FIG. 10 is a block diagram showing an example of a schematic configuration of a smart phone for a vehicle.

FIG. 10 is a block diagram showing an example of a schematic configuration of a smartphone 1000 to which the technique of the present disclosure may be applied. The smartphone 1000 includes a processor 1001, a memory 1002, a storage 1003, an external connection interface 1004, a camera 1006, a sensor 1007, a microphone 1008, an input device 1009, a display device 1010, a speaker 1011, a wireless communication interface 1012, a single or multiple antenna switches 1015, a single or multiple antennas 1016, a bus 1017, a battery 1018 and an auxiliary controller 1019.

The processor 1001 may be, for example, a CPU or a system on chip (SoC), and control functions of an application layer and other layers of the smartphone 1000. The memory 1002 includes an RAM and an ROM, and stores data and programs executed by the processor 1001. The storage 1003 may include a storage medium such as a semiconductor memory and a hard disk. The external connection interface 1004 is an interface for connecting an external device (such as a memory card and a universal serial bus (USB) device) to the smartphone 1000.

The camera 1006 includes an image sensor (such as a charge coupled device (CCD) and a complementary metal oxide semiconductor (CMOS)) and generates a captured image. The sensor 1007 may include a group of sensors such as a measurement sensor, a gyro sensor, a geomagnetic sensor, and an acceleration sensor. The microphone 1008 converts sounds inputted to the smartphone 1000 into audio signals. The input device 1009 includes, for example, a touch sensor configured to detect touch onto a screen of the display device 1010, a keypad, a keyboard, a button, or a switch, and receives an operation or information inputted by a user. The display device 1010 includes a screen such as a liquid crystal display (LCD) and an organic light-emitting diode (OLED) display, and displays an output image of the smartphone 1000. The speaker 1011 converts the audio signal outputted from the smartphone 1000 into sound.

The wireless communication interface 1012 supports any cellular communication scheme (such as LTE, LTE-Advanced and NR), and performs wireless communication. The wireless communication interface 1012 may typically include, for example, a BB processor 1013 and an RF circuit 1014. The BB processor 1013 may perform for example coding/decoding, modulation/demodulation and multiplexing/de-multiplexing, and perform various types of signal processes for wireless communication. The RF circuit 1014 may include, for example, a frequency mixer, a filter and an amplifier, and transmits and receives wireless signals via the antenna 1016. The wireless communication interface 1012 may be a chip module having the BB processor 1013 and the RF circuit 1014 integrated thereon. As shown in FIG. 10, the wireless communication interface 1012 may include multiple BB processors 1013 and multiple RF circuits 1014. Although FIG. 10 shows an example in which the wireless communication interface 1012 includes multiple BB processors 1013 and multiple RF circuits 1014, the wireless communication interface 1012 may include a single BB processor 1013 and a single RF circuit 1014.

Furthermore, in addition to the cellular communication scheme, the wireless communication interface 1012 may support another type of wireless communication scheme such as a short-range wireless communication scheme, a near field communication scheme, and a radio local area network (LAN) scheme. In this case, the wireless communication interface 1012 may include the BB processor 1013 and the RF circuit 1014 for each wireless communication scheme.

Each of the antenna switches 1015 switches connection destinations of the antennas 1016 among multiple circuits (such as circuits for different wireless communication schemes) included in the wireless communication interface 1012.

Each of the antennas 1016 includes a single or multiple antenna elements (such as the multiple antenna elements included in an MIMO antenna), and is used for the wireless communication interface 1012 to transmit and receive wireless signals. The smartphone 1000 may include the multiple antennas 1016, as shown in FIG. 10. Although FIG. 10 shows the example in which the smartphone 1900 includes the multiple antennas 1016, the smartphone 1000 may include a single antenna 1016.

Furthermore, the smartphone 1000 may include the antenna 1016 for each wireless communication scheme. In this case, the antenna switch 1015 may be omitted from the configuration of the smartphone 1000.

The bus 1017 connects the processor 1001, the memory 1002, the storage 1003, the external connection interface 1004, the camera 1006, the sensor 1007, the microphone 1008, the input device 1009, the display device 1010, the speaker 1011, the wireless communication interface 1012, and the auxiliary controller 1019 to each other. The battery 1018 supplies power to the various modules of the smartphone 1000 shown in FIG. 10 via a feeder line, which is partially shown as a dashed line in FIG. 10. The auxiliary controller 1019 operates a minimum necessary function of the smartphone 1000, for example, in a sleep mode.

In the smartphone 1000 shown in FIG. 10, the weight determining unit 110, the generating unit 120, the tire pressure determining unit 140, the size determining unit 150, the determining unit 160, and the generating unit 170 described with reference to FIG. 1 may be implemented by the processor 1001 or the auxiliary controller 1019. At least a part of the functions may be implemented by the processor 1001 or the auxiliary controller 1019. For example, the processor 1001 or the auxiliary controller 1019 may perform the functions of determining weight information of a vehicle, generating vehicle information, determining tire pressure information of a vehicle, determining size information of a vehicle, determining whether a vehicle exceeds a limitation condition of a road, and generating over-limit information, by executing instructions stored in the memory 1002 or the storage 1003.

Figure 11:
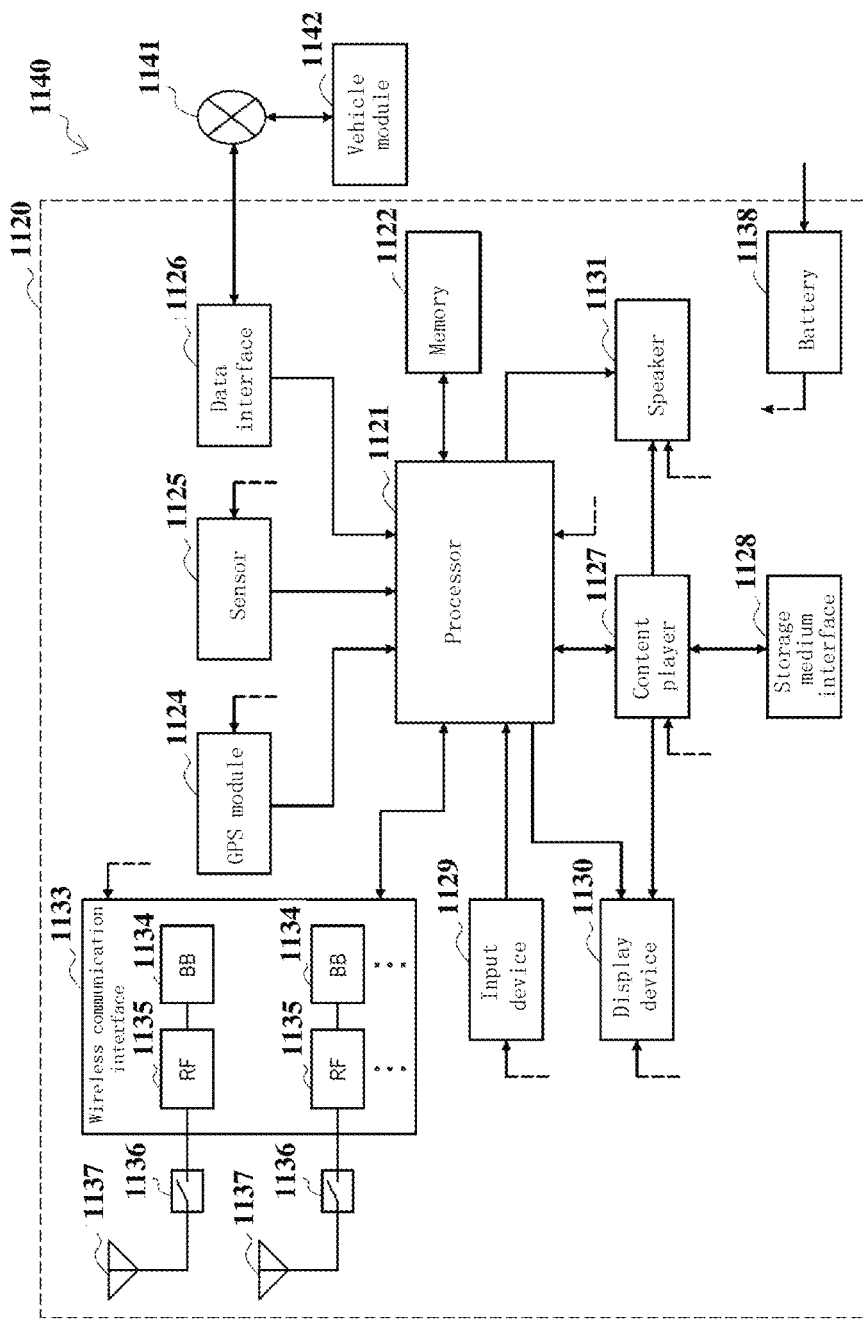
FIG. 11 is a block diagram showing an example of a schematic configuration of a car navigation device.

FIG. 11 is a block diagram showing an example of a schematic configuration of a car navigation device 1120 to which the technique of the present disclosure may be applied. The car navigation device 1120 includes a processor 1121, a memory 1122, a global positioning system (GPS) module 1124, a sensor 1125, a data interface 1126, a content player 1127, a storage medium interface 1128, an input device 1129, a display device 1130, a speaker 1131, a wireless communication interface 1133, a single or multiple antenna switches 1136, a single or multiple antennas 1137 and a battery 1138.

The processor 1121 may be, for example, a CPU or SoC, and controls the navigation function and additional functions of the car navigation device 1120. The memory 1122 includes an RAM and an ROM, and stores data and programs executed by the processor 1121.

The GPS module 1124 measures a location of the car navigation device 1120 (such as a latitude, a longitude and a height) using a GPS signal received from a GPS satellite. The sensor 1125 may include a group of sensors such as a gyroscope sensor, a geomagnetic sensor and an air pressure sensor. The data interface 1126 is connected to, for example, an in-vehicle network 1141 via a terminal that is not shown, and obtains data generated by the vehicle (such as vehicle speed data).

The content player 1127 reproduces content stored in a storage medium (such as a CD and a DVD) that is inserted into the storage medium interface 1128. The input device 1129 includes, for example, a touch sensor configured to detect touch onto a screen of a display device 1130, a button, or a switch, and receives an operation or information inputted by a user. The display device 1130 includes a screen such as a LCD or an OLED display, and displays an image for the navigation function or reproduced content. The speaker 1131 outputs sounds for the navigation function or the reproduced content.

The wireless communication interface 1133 supports any cellular communication scheme (such as LTE, LTE-advanced and NR), and performs wireless communication. The wireless communication interface 1133 may typically include, for example, a BB processor 1134 and an RF circuit 1135. The BB processor 1134 may perform, for example, coding/decoding, modulating/demodulating and multiplexing/de-multiplexing, and perform various types of signal processes for wireless communication. The RF circuit 1135 may include, for example, a frequency mixer, a filter and an amplifier, and transmits and receives wireless signals via the antenna 1137. The wireless communication interface 1133 may also be a chip module having the BB processor 1134 and the RF circuit 1135 integrated thereon. As shown in FIG. 11, the wireless communication interface 1133 may include multiple BB processors 1134 and multiple RF circuits 1135. Although FIG. 11 shows the example in which the wireless communication interface 1133 includes the multiple BB processors 1134 and the multiple RF circuits 1135, the wireless communication interface 1133 may include a single BB processor 1134 or a single RF circuit 1135.

Furthermore, in addition to a cellular communication scheme, the wireless communication interface 1133 may support another type of wireless communication scheme such as a short-range wireless communication scheme, a near field communication scheme, and a wireless LAN scheme. In this case, the wireless communication interface 1133 may include the BB processor 1134 and the RF circuit 1135 for each wireless communication scheme.

Each of the antenna switches 1136 switches connection destinations of the antenna 1137 among multiple circuits (such as circuits for different wireless communication schemes) included in the wireless communication interface 1133.

Each of the antennas 1137 includes a single or multiple antenna elements (such as the multiple antenna elements included in a MIMO antenna) and is used for the wireless communication interface 1133 to transmit and receive wireless signals. The car navigation device 1120 may include multiple antennas 1137, as shown in FIG. 11. Although FIG. 11 shows the example in which the car navigation device 1120 includes the multiple antennas 1137, the car navigation device 1120 may include a single antenna 1137.

Furthermore, the car navigation device 1120 may include the antenna 1137 for each wireless communication scheme. In this case, the antenna switch 1136 may be omitted from the configuration of the car navigation device 1120.

The battery 1138 supplies power to the various modules of the car navigation device 1120 shown in FIG. 11 via a feeder line, which is partially shown as a dashed line in FIG. 11. The battery 1138 accumulates power supplied from the vehicle.

In the car navigation device 1120 shown in FIG. 11, the determining unit 110, the generating unit 120, the tire pressure determining unit 140, the size determining unit 150, the determining unit 160, and the generating unit 170 described with reference to FIG. 1 may be implemented by the processor 1121. At least a part of the functions may be implemented by the processor 1121. For example, the processor 1121 may perform the functions of determining weight information of a vehicle, generating vehicle information, determining tire pressure information of a vehicle, determining size information of a vehicle, determining whether a vehicle exceeds a limitation condition of a road, and generating over-limit information, by executing instructions stored in the memory 1122.

The technique of the present disclosure may also be implemented as an in-vehicle system (or a vehicle) 1140 including one or more of the car navigation device 1120, an in-vehicle network 1141 and a vehicle module 1142. The vehicle module 1142 generates vehicle data (such as a vehicle speed, a motor speed and failure information), and outputs the generated data to the in-vehicle network 1141.

The preferred embodiments of the present disclosure are described above with reference to the drawings, but the present disclosure is not limited to the above examples. Various alternations and modifications may be obtained by those skilled in the art within the scope of the claims, and it should be understood that these alternations and modifications shall naturally fall within the technical scope of the present disclosure.

For example, a unit shown by a dashed box in the functional block diagram shown in the drawings indicates that the functional unit is optional in the corresponding device, and the optional functional units may be combined in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Apparently, such configurations are within the technical scope of the present disclosure.

In this specification, the steps described in the flowchart include not only processes performed in time series as the order described, but also processes performed in parallel or individually instead of having to be performed in time series. Further, even in the steps processed in time series, the order can be appropriately changed.

Although the embodiments of the present disclosure have been described above in detail in connection with the drawings, it is appreciated that the embodiments described above are merely illustrative rather than limitative for the present disclosure. Those skilled in the art may make various modifications and variations to the above embodiments without departing from the spirit and scope of the present disclosure. Therefore, the scope of the present disclosure is defined merely by the appended claims and equivalents thereof.

The invention claimed is:

1. An electronic device for a vehicle, comprising processing circuitry configured to:
   determine weight information of the vehicle;
   receive, from other vehicles in a motorcade where the vehicle is used as a head vehicle, weight information of the other vehicles;
   generate vehicle information, which comprises the weight information of the vehicle and weight information of the respective vehicles in the motorcade; and
   send the vehicle information of the vehicle and of the motorcade to a server, for the server to determine road planning information for the vehicle and the motorcade according to the sent vehicle information.

2. The electronic device according to claim 1, wherein the processing circuitry is further configured to:
   determine tire pressure information of the vehicle; and
   include, in the vehicle information, the tire pressure information of the vehicle.

3. The electronic device according to claim 1, wherein the processing circuitry is further configured to:
   determine size information of the vehicle, which comprises a length, a width and a height of the vehicle; and
   include, in the vehicle information, the size information of the vehicle.

4. The electronic device according to claim 1, wherein the processing circuitry is further configured to:
   receive, from the server, limitation condition information of respective roads within coverage of the server, the limitation condition information of a road comprising a limitation condition about at least one parameter of the road; and
   determine, according to the limitation condition information of the respective roads, whether the vehicle exceeds a limitation condition on a currently planned road.

5. The electronic device according to claim 4, wherein the processing circuitry is further configured to:
   send over-limit information to the server in a case where the vehicle exceeds the limitation condition on the currently planned road, such that the server re-determines road planning information for the vehicle.

6. The electronic device according to claim 1, wherein the processing circuitry is further configured to:
   receive, from the other vehicles, tire pressure information of the other vehicles; and
   include, in the vehicle information of the motorcade, the tire pressure information of the respective vehicles in the motorcade.

7. The electronic device according to claim 1, wherein the processing circuitry is further configured to:
- receive, from the other vehicles, size information of the other vehicles, which comprises a length, a width and a height of each of the other vehicles; and
- include, in the vehicle information of the motorcade, a total length of the motorcade, a maximum width of the motorcade, and a maximum height of the motorcade.

8. An electronic device, comprising processing circuitry configured to:
- receive, from a vehicle, vehicle information comprising weight information of the vehicle and weight information from other vehicles in a motorcade where the vehicle is used as a head vehicle:
- determine road planning information for the vehicle and the other vehicles in the motorcade according to the vehicle information received from the vehicle; and
- send the road planning information for the vehicle and the other vehicles in the motorcade to the vehicle.

9. The electronic device according to claim 8, wherein the vehicle information further comprises tire pressure information of the vehicle and/or size information of the vehicle, and wherein the size information of the vehicle comprises a length, a width and a height of the vehicle.

10. The electronic device according to claim 8, wherein the processing circuitry is further configured to:
- determine limitation condition information of respective roads within coverage of the electronic device, wherein the limitation condition information of a road comprises a limitation condition about at least one parameter of the road;
- determine, based on the received vehicle information, whether the vehicle exceeds the limitation condition of respective roads; and
- determine road planning information for the vehicle to avoid a road on which the vehicle exceeds the limitation condition of the road.

11. The electronic device according to claim 8, wherein the processing circuitry is further configured to:
- determine limitation condition information of respective roads within coverage of the electronic device, wherein the limitation condition information of a road comprises a limitation condition about at least one parameter of the road;
- estimate the vehicle information of the vehicle, wherein the vehicle information comprises at least one of the weight information of the vehicle, size information of the vehicle, and tire pressure information of the vehicle;
- determine, according to the estimated vehicle information, whether the vehicle exceeds the limitation condition of respective roads; and
- determine road planning information for the vehicle to avoid a road on which the vehicle exceeds the limitation condition of the road.

12. The electronic device according to claim 10, wherein the processing circuitry is further configured to:
- determine that the vehicle exceeds the limitation condition of a road in a case where a current weight of the vehicle exceeds the limitation condition of the weight on the road.

13. The electronic device according to claim 8, wherein the processing circuitry is further configured to:
- determine whether the vehicle is overweight based on a received current weight of the vehicle and a maximum weight of the vehicle; and
- generate warning information in a case where the vehicle is overweight.

14. The electronic device according to claim 8, wherein the processing circuitry is further configured to:
- estimate a current weight of the vehicle and a maximum weight of the vehicle;
- determine whether the vehicle is overweight based on an estimated current weight of the vehicle and a maximum weight of the vehicle; and
- generate warning information in a case where the vehicle is overweight.

15. The electronic device of claim 8, wherein the processing circuitry is further configured to:
- send limitation condition information of respective roads within coverage of the electronic device, for the vehicle to determine whether the vehicle exceeds a limitation condition on a currently planned road according to the limitation condition information of the road, wherein the limitation condition information of a road comprises a limitation condition about at least one parameter of the road.

16. The electronic device of claim 15, wherein the processing circuitry is further configured to:
- receive, from the vehicle, over-limit information indicating that the vehicle exceeds the limitation condition on the currently planned road; and
- re-determine the road planning information for the vehicle based on the over-limit information.

17. The electronic device according to claim 8, wherein the vehicle information of the motorcade further comprises:
- tire pressure information of respective vehicles in the motorcade; and/or
- a total length of the motorcade, a maximum width of the motorcade, and a maximum height of the motorcade.

18. A wireless communication method performed by an electronic device for a vehicle, comprising:
- deteii lining weight infoiination of the vehicle;
- receiving, from other vehicles in a motorcade where the vehicle is used as a head vehicle, weight information of the other vehicles;
- generating vehicle information comprising the weight information of the vehicle and weight information of the respective vehicles in the motorcade; and
- sending the vehicle information of the vehicle and of the motorcade to a server, for
- the server to determine road planning information for the vehicle and the motorcade according to the sent vehicle information.

* * * * *